May 19, 1959   G. H. MYERS   2,887,653
TIME INTERVAL ENCODER
Filed April 19, 1955   3 Sheets-Sheet 1

INVENTOR
G. H. MYERS
BY
H. O. Wright
ATTORNEY

May 19, 1959     G. H. MYERS     2,887,653
TIME INTERVAL ENCODER
Filed April 19, 1955     3 Sheets-Sheet 2
FIG. 4
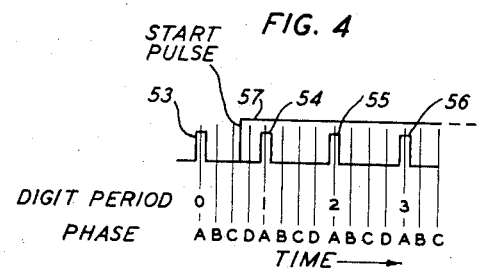
FIG. 5
"START" FRACTIONAL DIGIT PERIOD TABLE
| PHASE | FRACTIONAL PART OF A DIGIT PERIOD | BINARY NUMBER (W, X) |
|---|---|---|
| A | 0 | 00 |
| B | 3/4 | 11 |
| C | 1/2 | 10 |
| D | 1/4 | 01 |
FIG. 6
"STOP" FRACTIONAL DIGIT PERIOD TABLE
| PHASE | FRACTIONAL PART OF A DIGIT PERIOD | BINARY NUMBER (W, X) |
|---|---|---|
| A | 0 | 00 |
| B | 1/4 | 01 |
| C | 1/2 | 10 |
| D | 3/4 | 11 |
FIG. 7
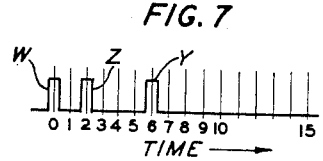
INVENTOR
G. H. MYERS
BY
H. O. Wright
ATTORNEY May 19, 1959

G. H. MYERS 2,887,653

TIME INTERVAL ENCODER

Filed April 19, 1955

INVENTOR
G. H. MYERS
BY
H. O. Wright
ATTORNEY

United States Patent Office 2,887,653
Patented May 19, 1959

2,887,653

TIME INTERVAL ENCODER

George H. Myers, Fanwood, N.J., assignor to Bell Telephone Laboratories, Incorporated, New York, N.Y., a corporation of New York Application April 19, 1955, Serial No. 502,284

8 Claims. (Cl. 324—68)

This invention relates to circuits for measuring time intervals and for representing the duration of the timed intervals in digital form.

It has previously been proposed to measure the elapsed time between two electrical signals by gating a standard frequency source through a gating circuit to an accumulator during the period between the two signals. Thus, for example, when a source of pulses occurring at one second intervals is connected by a switch to an accumulator and the switch is closed briefly, the number read from the accumulator after the opening of the switch indicates in seconds the length of time that the switch was closed. When the measurement circuits are to be incorporated into a computer apparatus, however, the accuracy of the time measurements may be limited by the operating speed of the accumulator circuits.

Accordingly, the principal object of the present invention is to increase the accuracy of time interval measuring and encoding systems.

The present time interval encoder is used with a serial binary computer. The term "binary" indicates that the computer operates on a base of two instead of the base of ten which is used in the decimal system. The term "serial" is employed to indicate that the binary digits of a multidigit number appear successively on a single information channel or wire, rather than as separate "parallel" indications appearing on separate wires. In a serial binary computer, the successive digits in a multidigit binary number are spaced by a time interval which is designated a "digit period." Multidigit binary numbers appear on a single information channel spaced by an interval which is termed a "word period." By way of example, in the actual computer technology with which the present time encoder circuits are employed, a digit period is equal in duration to one microsecond; and a word period is sixteen microseconds in length, corresponding to the sixteen digits which make up each multidigit binary number.

In accordance with the invention, time intervals may be measured to a fractional part of the pulse repetition interval or digit period of a binary accumulator by a logic circuit which determines the fractional portion of the digit period in which the time interval begins or stops, and translates this information into binary signals. At the input to the serial binary accumulator, the binary signals representing fractional digit periods are appropriately weighted and are combined with other pulse information indicating the integral number of word periods and digit periods which are included in the time interval.

A feature of the invention is a logic circuit which stores the binary signals representing the fractional portions of a digit period in parallel form as indications at two separate points in the circuit. This information is thereafter converted to appropriately timed serial binary signals and applied to the input of the accumulator.

Other objects and various advantages and features of the invention will become apparent by reference to the following detailed description taken in connection with the accompanying drawings forming a part thereof and from the appended claims.

In the drawings:

Fig. 4 is a pulse diagram which is useful in the interpretation of Fig. 3;

Figs. 5 and 6 are tables employed to interpret the present encoding circuits;

Fig. 7 is a diagram of an illustrative pulse train at the input of the accumulator.

Figure 1:
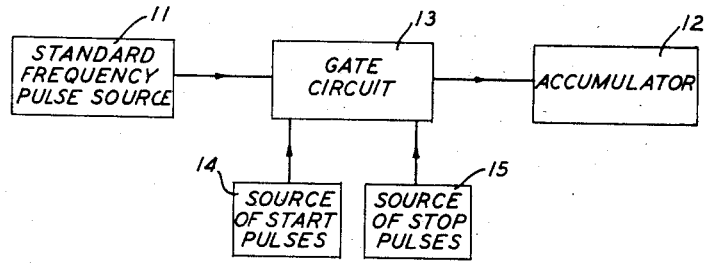
Fig. 1 is a block diagram of a time interval encoding circuit of the prior art.

Referring more particularly to the drawings, Fig. 1 illustrates a time encoder of the prior art. In Fig. 1, a standard frequency pulse source 11 is connected to an accumulator 12 by means of a gating circuit 13. A time interval to be measured is defined by the interval between the occurrence of a start pulse at the output of unit 14 and a stop pulse at the output of unit 15. The gate 13 is opened for this time interval. The accumulator 12 counts the number of pulses from the standard pulse source 11 which are gated through the unit 13, and thus indicates the time interval between the occurrence of a start pulse and a later stop pulse. For example, if the pulse source 11 transmits one pulse each second, the number recorded by the accumulator 12 would indicate the length of the measured time interval in seconds.

Figure 2:
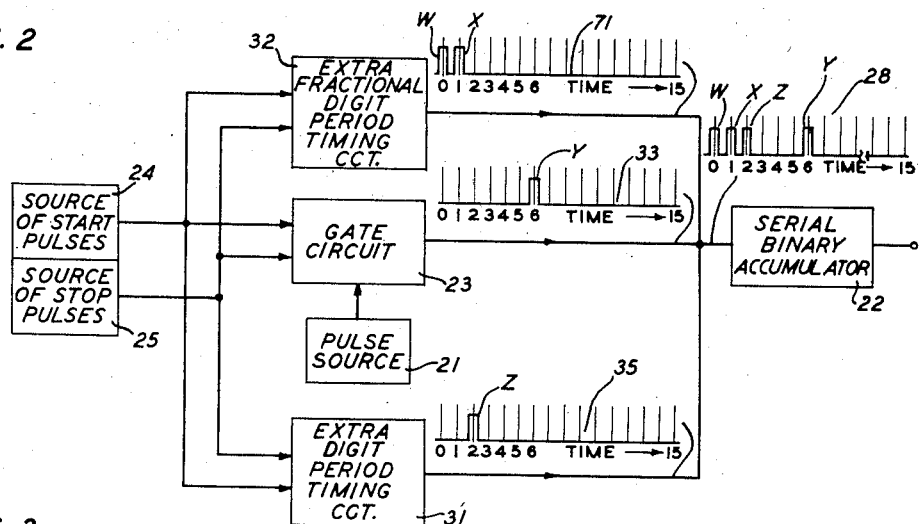
Fig. 2 is a block diagram of an improved time interval encoding circuit in accordance with the present invention.

The circuit of Fig. 1 is shown at 21 through 25 of Fig. 2 to be a part of the latter circuit. As in the circuit of Fig. 1, the gate 23 is opened to pass pulses from the pulse source 21 to the accumulator 22 for the period between start and stop pulses from units 24 and 25, respectively.

In the circuit of Fig. 2, however, the accumulator 22 is a serial binary accumulator. In the serial binary computer circuits of which the accumulator 22 is a part, the multidigit binary numbers are represented by pulse trains. As indicated by pulse train 28 at the input to the accumulator 22, each binary number is made up of sixteen binary digits. The pulse train 28 represents the binary number 1110001000000000, which is written above with the least significant digit at the left (instead of at the right, in the usual manner for decimal numbers). In pulse train 28 there are sixteen time slots designated 0 through 15 which correspond to the sixteen digits of the binary numbers which are to be represented. A pulse in a specific time slot represents a "1" in the corresponding digit of the binary number, and the absence of a pulse represents a "0." The time interval between successive time slots is termed a "digit period" and, in the present illustrative circuits, is equal to one microsecond. Complete sixteen digit binary numbers are transmitted past any point in the computer circuitry in sixteen microseconds. This sixteen microsecond period required for the transmission of a single multidigit number is termed a "word period." A word period is made up of sixteen digit periods, and is therefore sixteen microseconds in length. Thus, a number four and one-quarter word pulse is one which occurs once every sixteen microseconds and starts one-quarter of a digit period after the start of the fourth time slot.

A limitation on the simple time encoding circuit made up of units 21 through 25 of Fig. 2 is the speed of operation of the serial binary accumulator 22. Because the accumulator 22 can only accept incoming binary signals and add them to signals stored in the accumulator at a sixteen microsecond rate, the pulse source 21 has a pulse repetition period of sixteen microseconds. It was considered necessary for the present purposes to measure time intervals to a higher degree of accuracy. In order to accomplish this, the extra digit period timing circuit 31 and the extra fractional digit period timing circuit 32 have been added to the basic circuitry.

The mode of operation of the extra digit period timing circuit 31 is disclosed in detail in G. Kronacher application Serial No. 457,126, filed September 20, 1954, and assigned to the assignee of the present application. In operation, integral word periods are represented by pulses from the pulse source 21 which are gated through to the accumulator 22 by the circuit 23. These pulses are designated "Y," and are indicated at 33 in Fig. 2. The additional logic circuits 31 and 32 are designed to measure the time intervals between the occurrence of a start pulse from source 24 and the occurrence of the next subsequent word period pulse from the pulse source 21, and the elapsed time between the termination of the time interval to be measured as indicated by a pulse from the source of stop pulses 25 and the occurrence of the next preceding pulse from the pulse source 21.

The circuit 31 measures the additional digit periods which are included at the beginning and the end of the time interval to be measured. Pulses from the extra digit period timing circuit 31 are designated "Z," and appear at 35 in Fig. 2. These pulses represent digit periods which are one-sixteenth as long as the word periods represented by the pulses "Y." In the pulse train patterns such as 28 and 35 in Fig. 2, the least significant digits appear first in time. Therefore, the pulses "Z" which represent one-sixteenth as much time as the pulses "Y" appear four time slots before the pulses "Y." This is explained in greater detail in the above-identified application of G. Kronacher.

It was determined that time measurements to the nearest digit period were not sufficiently accurate. Accordingly, the circuit 32, which measures fractions of digits periods, has been added. In accordance with the present invention, the circuit 32 is capable of measuring time to the nearest one-quarter digit period, and thus increases the accuracy of the present time encoding circuits by a factor of four.

Figure 3:
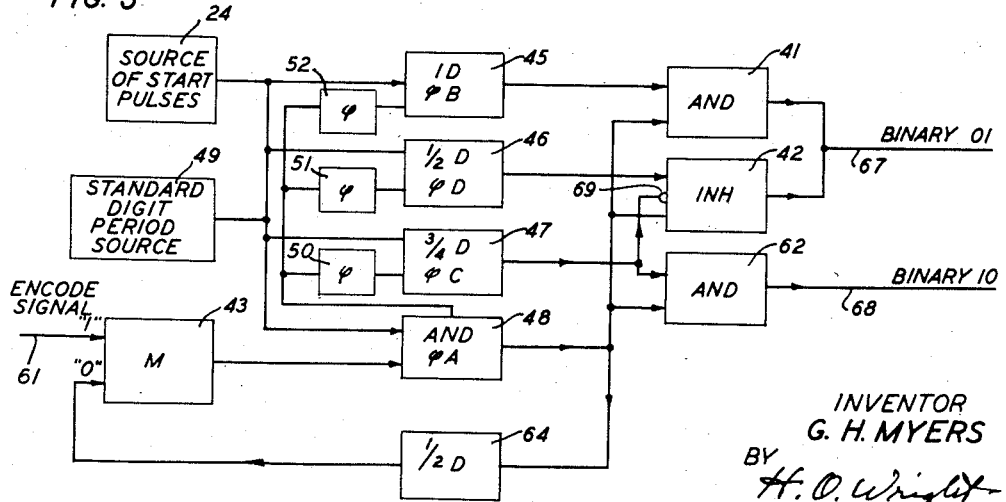
Fig. 3 is a logic circuit diagram of a portion of the present timing circuits.
Figure 8:
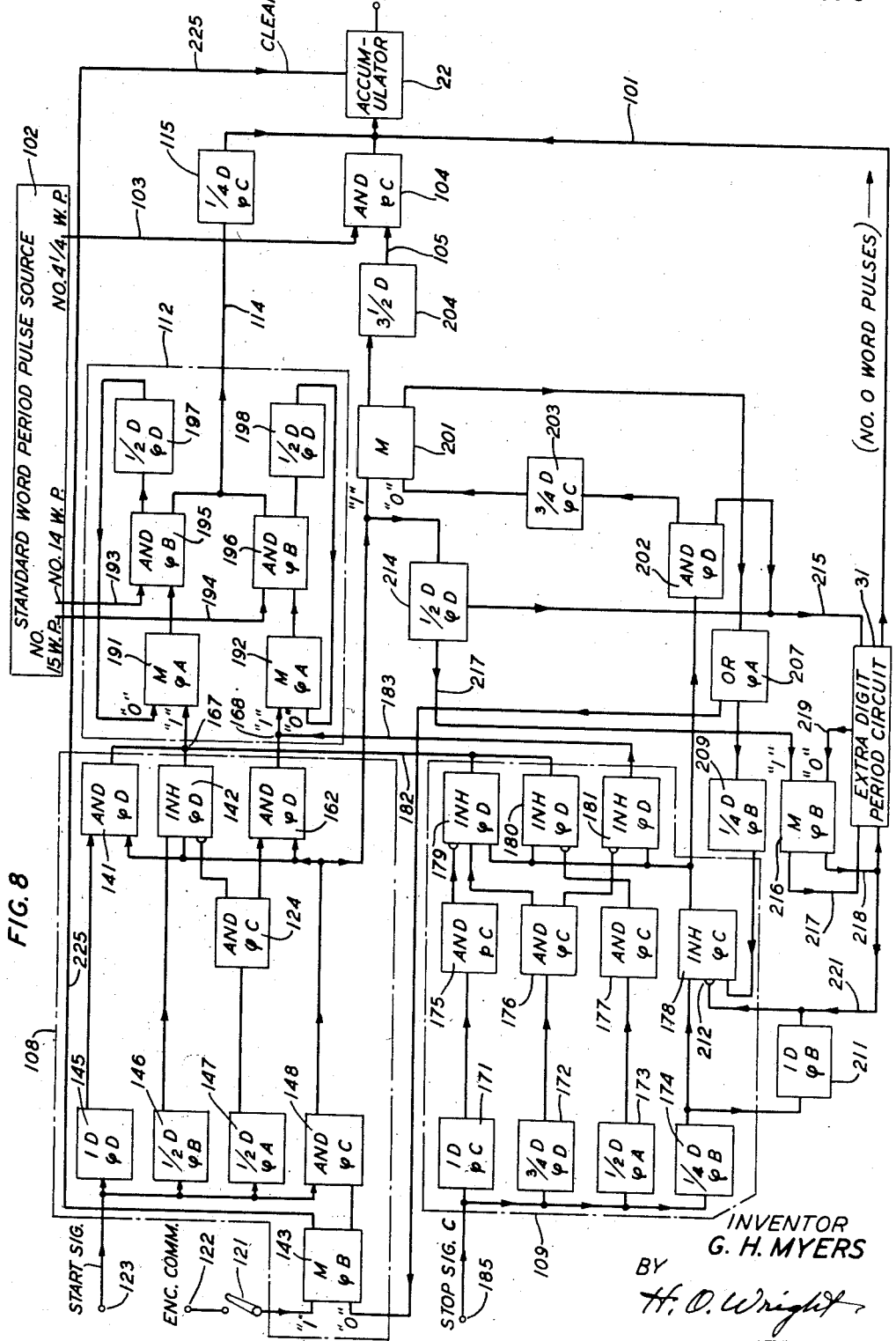
Fig. 8 is a complete logic circuit diagram of the encoding circuits of the present invention.

In Figs. 3 and 8, the present circuits are disclosed in terms of logic circuit diagrams. These logic circuit diagrams are shown in terms of several types of basic logic circuits which are employed in digital computers. While any of a large number of types of the basic logic circuits which have been proposed by the prior art may be used in the present encoder, one satisfactory set of logic circuit units is disclosed in an article entitled "Regenerative Amplifier for Digital Computer Applications" by J. H. Felker, which appeared at pages 1584 through 1596 of the November 1952 issue of the Proceedings of the I.R.E. (volume 40, No. 11). The five basic logic circuit elements which are disclosed on pages 1594 and 1595 of this article, and which are employed in the circuit diagrams of Figs. 3 and 8, are as follows:

And units, such as unit 41 of Fig. 3, require the energization of all inputs to yield an output.

Inhibit units, such as unit 42 in Fig. 3, are designated "INH." Inhibit units are generally similar to And units in that all of the normal inputs to the unit must be energized for them to yield an output pulse. However, a pulse on the inhibit input lead (marked with a semicircle at the point where the inhibit lead connects to the inhibit box) overrides all other signals and blocks the output of the unit.

Memory units, such as 43 in Fig. 3, are designated "M." They may be set to either of two conditions, the "0" state or the "1" state. When set to the "0" state, they have no output. When the "set 1" lead has been energized, however, the memory unit generates pulses one at each digit interval until the memory unit is reset to the "0" condition. When both input leads are energized simultaneously, the memory unit assumes the "0" state, and has no output.

Or units, such as unit 207 of Fig. 8, are essentially buffer elements. Or units yield an output pulse if any input lead is energized.

Delay units, such as 45 and 46 in Fig. 3, are indicated by boxes with the letter "D" therein, together with a number indicating the number of digit times of delay included in the unit. The four logic elements noted above also introduce a delay of one-quarter digit period, or one-quarter microsecond.

As disclosed in the article by J. H. Felker cited above, the pulse regenerator is an important part of these logic circuits. The specific circuit shown in the Felker article operated satisfactorily, and may be used. However, somewhat improved results may be obtained when another version of the regenerator is employed. The improved circuits are disclosed in Patent No. 2,853,629 of J. H. Felker, which issued on September 23, 1958.

The circuit of Fig. 3 is designed to determine the number of fractional portions of a digit period between the occurrence of a start pulse and the occurrence of the next following digit pulse. This is accomplished by the use of logic circuit elements which are enabled during successive fractional portions of a digit period. In the circuit of Fig. 3, it is desired to measure time to the nearest one-quarter digit period. The four logic units 45, 46, 47 and 48 are accordingly enabled during different quarter microsecond intervals.

The pulse diagram of Fig. 4 is useful in interpreting the circuit of Fig. 3. In Fig. 4, the pulses 53, 54, 55 and 56 represent successive digit period pulses. A start pulse 57 is shown superposed in the plot of Fig. 4. The start pulse 57 normally extends for several digit periods, and at least extends for more than one digit period. As indicated in Fig. 4, each digit period is divided into four subintervals designated A, B, C and D. As mentioned above, the extra fractional digit period circuit shown in Fig. 3 is designed to measure the time between the occurrence of a start pulse and the next following digit period pulse. In the example shown in Fig. 4, the start pulse occurs between the instant designated C, and that designated D. Under these circumstances, the logic circuit of Fig. 3 adds one-quarter digit period or one-quarter microsecond to the numerical representation at the input to the accumulator.

The four logic circuits 45 through 48 of Fig. 3 are enabled during successive one-quarter digit period time intervals. A standard frequency source 49 having a period equal to one digit period is employed to enable the logic circuits 45 through 48. However, the standard frequency source is progressively shifted in phase by the phase shifting circuits 50, 51 and 52, and different phases are applied to each of the logic circuit elements. For example, the And unit 48 is enabled during phase A, the delay unit 45 is enabled during phase B, and the delay units 47 and 46 are enabled during phases C and D, respectively. These phases correspond to the time intervals designated A, B, C and D in Fig. 4.

In Fig. 5, a table is presented which indicates the number of one-quarter digit periods which must be indicated by the logic circuit when the start pulse occurs in each of the four phases of the standard frequency source. If the start pulse occurs at phase A, no additional fractional digit periods should be indicated, because the beginning of the time interval coincides with the occurrence of one of the digit pulses 53 through 56. If the start pulse occurs during phase B, this corresponds to a time which is three-quarters of a digit period before the next following digit period pulse. Therefore, the logic circuit of Fig. 3 should have an output of 3, which is expressed in binary terms as "11." Similarly, when the start pulse occurs in phases C or D, the circuit of Fig. 3 should indicate two (binary "10") or one (binary "01"), respectively.

In the circuit of Fig. 3, the memory unit 43 is employed to register the encode signal which is applied to lead 61. The lead 61 is connected to the "set 1" input of the memory unit 43. After the encode signal has been received, the memory unit 43 has an output which is made up of a steady series of pulses at one digit period intervals. When a start pulse is received from the source of start pulses 24 concurrently with phase A of the standard digit period source, both of the input leads to the And unit 48 are energized, and it transmits an output pulse. The delay units 45, 46 and 47, however, are energized by different phases of the standard frequency source, and therefore are not enabled, and the start pulse is not transmitted through these delay units. The output pulse from the And unit 48 is applied to the And unit 41, the inhibit unit 42, and the And unit 62. Because the other inputs to the logic units 41, 42 and 62 are not energized, however, no pulses will be transmitted through these units. The output from the And unit 48 will be transmitted through the one-half digit delay unit 64 to the "set 0" input of the memory unit 43. With the memory unit 43 reset to the "0" state, it no longer transmits output pulses, and further output pulses from the And unit 48 are prevented. The output leads 67 and 68 of the logic circuit of Fig. 3 represent the binary digits "01" and "10," respectively. When neither of these leads are energized by binary numbers, "00" is indicated. Thus, in the present instance, when the start pulse occurs simultaneously with phase A, the logic circuit has no output. This corresponds to the desired result as indicated by Figs. 4 and 5.

When the start pulse occurs concurrently with phase B, the length of the start pulse, as indicated by 57 in Fig. 4, energizes all of circuits 45, 46, 47 and 48 during successive quarter microsecond intervals. With each of the logic units 45 through 48 being energized in successive quarter microsecond intervals and having successively reduced internal delay, each of these units transmits an output pulse at the same instant. Under these circumstances, both input leads to the And unit 41 are energized, and the output lead 67 therefore receives a pulse; and both inputs to the And unit 62 are also energized, and the output lead 68 is also pulsed. With output lead 67 indicating binary "01" and output lead 68 indicating binary "10," the energization of both of these circuits indicates the binary number "11." This corresponds with the value shown in the table of Fig. 5, and indicates that the start pulse occurred three-quarters of a microsecond before the next succeeding digit period pulse.

When the start pulse occurs simultaneously with phase C, only phases C, D and A are energized. Accordingly, the logic units 46, 47 and 48 have simultaneous output pulses. The And unit 41 has only one of its input leads energized and does not transmit an output pulse to lead 67. The inhibit terminal 69 of the inhibit unit 42 is energized by the output from logic unit 47, and therefore is disabled. Lead 67 does not, therefore, receive any pulses, and remains deenergized. The And unit 62 is energized by pulses from the logic units 47 and 48, and produces an output pulse on lead 68. The resulting binary number "10" indicates that the start pulse occurred two quarter microseconds before the occurrence of the next digit period pulse. This is again in accordance with the table of Fig. 5. The logic circuit 45 which is enabled by phase B of the standard frequency source, is enabled by the extended nature of the start pulse 57, as shown in Fig. 4, during the following cycle. However, the next succeeding pulse from the And unit 48 is blocked by the resetting of the memory unit 43 discussed above. Accordingly, the input to the And unit 41 from the And unit 48 is not present concurrently with the later energization of logic unit 45, and And unit 41 remains deenergized. When the start pulse occurs in synchronism with phase D, logic units 46 and 48 have concurrent output pulses. Under these circumstances, the inhibit unit 42 is energized. This in turn energizes the output lead 67 representing the binary number "01." Because logic unit 47 is not enabled, no pulse appears at the output of And unit 62, and lead 68 remains deenergized. The signal "01" indicates that the start pulse occurred one-quarter microsecond before the next following digit period pulse. This corresponds to the value indicated in Fig. 5.

In Fig. 3, the delay units such as units 45 and 46, for example, include a pulse regenerator, and are therefore termed "active" delay units. When start pulses which are not synchronized with the regenerators are applied to the active short delay units, it is possible to get output pulses of reduced width. These may not trigger successive logic packages. To avoid this difficulty, the standard pulse regenerator at the input of the active short delay may be modified by the addition of another input. One of the two inputs of the delay units is the input to the active short delay unit shown on the drawings. The other input is connected and timed to inhibit any signals which would otherwise cause output pulses of widths less than eighty percent of normal, for example.

Referring again to Fig. 2, the pulse pattern 71 represents the digits from the logic circuit 32 which may be applied to the accumulator 22. The pulse labeled "W" corresponds to the binary digit "01" which appears at lead 67 in Fig. 3, and the pulse designated "X" in Fig. 2 corresponds to the binary number "10" which appears on lead 68 of Fig. 3. In the combined pulse pattern designated 28 at the input to the accumulator 22, it may be observed that the pulses "W" and "X" appear to the left of the pulse "Z." This indicates that they are of less numerical significance than the pulse "Z." A pulse in pulse position "X" indicates that one-half a digit period is added to the time interval represented by pulses "Y" and "Z." Similarly, a pulse in pulse position "W" indicates that an additional one-quarter digit period of delay is added. The pulse train of Fig. 7 corresponds to the relationship between the start pulse 57 and the digit period pulse 54 shown in Fig. 4. Because the start pulse occurred during phase D, one-quarter microsecond is added to the measured time interval. This is indicated by the binary number "01" which is represented by the pulses designated "W." Accordingly, in the pulse train of Fig. 7, a pulse appears in positions "W," "Z," and "Y." No pulse appears in pulse position "X," however, because the output lead 68 representing binary "10" is not energized under the circumstances shown in Fig. 4.

Fig. 6 is a table of the fractional digit periods which must be added when a stop pulse occurs during each of the various phases A through D. This table is similar to that of Fig. 5, but each value represents the complement of the corresponding value in Fig. 5. For example, when the stop pulse occurs during phase A, there is again no required output. When the stop pulse occurs during phase B, however, one-quarter digit period must be added instead of the three-quarters indicated in Fig. 4. Similarly, for phases C and D, one-half and three-quarters of a digit period must be added to obtain the correct elapsed time between the stop pulse and the next preceding digit pulse.

Fig. 8 represents a detailed logic circuit diagram of the circuit shown in Fig. 2 in block diagram form. In the circuit of Fig. 8, as in Fig. 2, the accumulator 22 appears at the right-hand side of the circuit. Similarly, the extra digit period circuit 31 appears at the lower part of the circuit diagram. The extra digit period pulses are applied to the accumulator 22 through the lead 101. Pulses representing integral word periods originate in the standard word period pulse source 102. Number four and one-quarter word pulses are applied on lead 103 to the And unit 104. When the other input lead 105 to the And unit 104 is energized concurrently with the arrival of a word pulse on lead 103, the word pulse is gated through to the accumulator 22. The timing of the energization of lead 105 will be discussed in greater detail hereinafter.

The greater portion of the circuitry shown in Fig. 8 is directed to the measurement of extra fractional digit periods. For example, the circuits 108 and 109 shown enclosed by dashed lines produce a binary indication of the extra fractional digit periods at the beginning and the end, respectively, of the time interval to be measured. The circuit 112, which is also enclosed in a dashed line box, translates the parallel binary indications from the circuits 108 and 109 into serial binary form. The pulses representing extra fractional digit periods appear at lead 114 at the output of circuit 112. These pulses are delayed by one-quarter digit period in the delay unit 115 and are then applied to the accumulator 22.

In the preceding paragraphs, the three inputs to the accumulator 22 in Fig. 8 have been discussed. Comparing Fig. 8 with Fig. 2, it may be noted that the three accumulator inputs from units 115, 104 and 31 of Fig. 8 correspond to the three inputs from units 32, 23 and 31, respectively, of Fig. 2. Thus, the output from the delay unit 115 represents extra fractional digit periods, the output from And unit 104 represents integral word periods, and the output from unit 31 on lead 101 represents extra digit periods. Furthermore, the pulses at each of these three points in the circuit correspond in relative time displacement to the pulse trains shown in Fig. 2.

In view of the detailed disclosure of the word period and the extra digit period circuits in an application of G. Kronacher cited above, they will be disclosed only briefly here. Proceeding to a detailed consideration of the circuit of Fig. 8, the enabling switch 121 must be closed before the system is set into operation. Following the closure of the enabling switch 121, the appearance of an encode command at terminal 122 sets the memory unit 143 to the "1" state.

The circuit 108 of Fig. 8 is substantially the same as the circuit of Fig. 3 described above. The logic circuit components in circuit 108 have therefore been designated by numbers which are the same as the numbers of the corresponding components of Fig. 3, but which are prefixed by a "1." Thus, the memory unit 43 in Fig. 3 finds its counterpart in memory unit 143 in circuit 108 of Fig. 8.

However, there are certain slight differences between circuit 108 in Fig. 8 and the circuit of Fig. 3. For example, instead of the single three-quarter digit period delay unit 47 of Fig. 3, the circuit 108 includes a one-half digit period delay unit 147 in series with an And unit 124. The And unit is employed in practice to provide the additional drive required to energize the two output leads. Because the And unit introduces one-quarter digit period delay, the circuits may be shown either as indicated at Fig. 3 or in circuit 108.

The phases of the logic circuit units shown in Fig. 3 are also different from those shown in circuit 108 of Fig. 8. The reason for this difference lies in the assumption of phase A as the zero reference in Fig. 3 and the use of phase C as the zero reference phase in the circuit of Fig. 8. The And unit 104 which gates the pulses representing integral word periods to the accumulator is a phase C logic circuit unit. This establishes phase C as the zero frame of reference. Accordingly, when a start signal is applied at terminal 123 of Fig. 8 during phase C, no output is produced at the output terminals 167 and 168 of circuit 108. Similarly, when the pulse is applied during phase D, both output terminals 167 and 168 are energized, indicating by the binary number 11 that three-quarters of a digit period is to be added to the measured time period. When the start pulse occurs during phases A or B, output terminals 168 or 167 are energized to indicate the binary numbers 10 or 01, respectively.

The circuit 109 includes the input delay units 171, 172 and 173, four And units 174 through 177, and four inhibit units 178 through 181. The two output leads 182 and 183 from the circuit 109 are connected to the input terminals 167, 168 of the translator circuit 112. When a stop signal is applied at input terminal 185 of the logic circuit 109, a parallel binary signal is developed on leads 182, 183, indicating the fractional portion of a digit period which must be added in the accumulator to properly indicate the extra fractional digit periods at the end of the measured time interval. By tracing through the logic circuitry of circuit 109 in the manner set forth above for Fig. 3, the output signals for stop pulses occurring in each of the four phases may readily be developed. These turn out to be as follows:

Phase C (reference): neither lead 182 (binary 01) nor lead 183 (binary 10) is energized.
Phase D: only lead 182 (binary 01) is energized.
Phase A: only lead 183 (binary 10) is energized.
Phase B: both lead 182 (binary 01) and lead 183 (binary 10) are energized.

The translating circuit 112 changes the binary indications at terminals 167 and 168 from parallel (concurrent) binary signals into serial binary form. The pulses at terminals 167 and 168 are developed at different times in both circuits 108 and circuit 109. The pulses at terminals 167 and 168 are registered by setting the respective memory units 191 or 192 to the "1" state. The memory units then produce a continuous train of output pulses. At the proper instant, word pulses on leads 193 and 194 gate a single pulse through the appropriate And unit 195 or 196. The pulses from And units 195 and 196 are transmitted on lead 114 through the delay unit 115 to the accumulator 22. A delay loop including the one-half digit delay unit 197 resets the memory unit 191 to the "0" state after the transmission of an output pulse from And unit 195. Similarly, memory unit 192 is also reset to its "0" state by a pulse transmitted through the one-half digit delay unit 198.

Other circuits which are required for the proper operation of the circuit of Fig. 8 will now be discussed. When start pulses which are applied to terminal 123 are gated through And unit 148, they are transmitted through circuit 108 and set the memory unit 201 to the "1" state. Stop pulses are later applied through memory unit 174, inhibit unit 178, And unit 202 and delay unit 203 to reset memory unit 201 to the "0" state. While the unit 201 is set to the "1" state, it transmits a steady series of pulses through delay unit 204 to And unit 104. For a time interval which is equal in length to the time between the start and stop pulses, lead 105 at the input to And unit 104 is energized, and word pulses from unit 102 are gated through to the accumulator 22.

The delay loop, including the one-half digit delay unit 64 of Fig. 3, also finds its equivalent in Fig. 8. The corresponding delay loop includes the And unit 148, the memory unit 201, the Or unit 207 and the "set 0" terminal of the memory unit 143. When a start pulse traverses this loop, the memory unit 143 is reset to the "0" state, the And gate 148 is closed, and no additional start pulses may be introduced prior to the reception of another encode signal.

Signals from the Or unit 207 are also transmitted through the one-quarter digit delay unit 209 to enable the inhibit unit 178. This prevents premature operation of the extra fractional digit period circuit 109.

The delay unit 211 is connected between the delay unit 174 and the inhibit terminal 212 of the inhibit unit 178. This blocks the inhibit unit 178 after one digit period, and avoids false output pulses on leads 182 and 183 which might otherwise be caused by a prolonged stop signal pulse.

As explained in detail in G. Kronacher application Serial No. 457,126 mentioned hereinabove, the extra digit period circuit 31 indicates the extra digit periods at both the beginning and the end of the measured time interval. Pulses indicating the beginning of the measured time interval are applied to the extra digit period circuit 31 through the And unit 148, the one-half digit delay unit 214 and lead 215. When an input signal pulse passes through delay unit 214, a pulse is also applied to lead 217 and sets memory unit 216 to the "1" state. Memory unit 216 has two output leads 217 and 218 which are connected to the extra digit period circuit 31. As long as pulses are present on these two leads, the circuit 31 is set to determine extra digit periods at the beginning of the measured time period. When the circuit 31 has completed its cycle of processing the extra digit information at the beginning of the measured time period, a pulse is applied on lead 219 to reset memory unit 216 to the "0" state. It may also be noted that output signals from memory unit 216 are coupled through leads 218 and 221 to the inhibit terminal 212 of inhibit unit 178. This prevents the reception of stop signals until the extra digit period circuit has completed processing pulses derived from the start signal.

Another required control operation is the clearing of the accumulator 22 at the beginning of a new time interval measurement. This is accomplished by the control lead 225 which is connected from the output of the memory unit 143 to the accumulator 22. When the memory unit 143 is set to the "1" state by an encode signal, pulses are applied to lead 225. A logic circuit (not shown) associated with the accumulator 22 clears the result stored in the accumulator from the previous time interval measurement when lead 225 is energized.

It is to be understood that the above-described arrangements are illustrative of the application of the principles of the invention. Numerous other arrangements, such as a circuit in which time intervals are measured to fractional parts of a digit period other than one-quarter of a digit period, may be devised by those skilled in the art without departing from the spirit and scope of the invention.

What is claimed is:

1. In a computer circuit for encoding time intervals, a serial binary accumulator having a pair of input terminals, a standard frequency source for synchronizing operations in the computer circuit, the period of said source being equal to one digit period of said computer, means for electrically indicating the beginning and end of a time interval which is to be measured, means for applying pulses to said accumulator input terminals indicating the number of integral digit periods included in said time interval, means for determining additional fractional digit periods included in said time interval, means for indicating the time represented by said fractional digit periods in parallel binary form, means for converting said parallel binary information into serial form and for applying it to said accumulator input terminals, and means for appropriately weighting the serial binary signals representing fractional digit periods at the input terminals to said accumulator with respect to pulses representing integral digit periods.

2. In a computer circuit for encoding time intervals, a serial binary accumulator having an input circuit, a standard frequency source for synchronizing operations in the computer circuit, the period of said source being equal to one digit period of said computer, means for electrically indicating the beginning and end of a time interval which is to be measured, means for applying pulses to said accumulator input circuit indicating the number of integral digit periods included in said time interval, means for determining additional fractional digit periods included in said time interval, means for indicating the time represented by said fractional digit periods in multidigit parallel binary form, means for converting said multidigit parallel binary information into serial form and for applying it to said accumulator input circuit, and means for appropriately weighting the serial binary signals representing fractional digit periods at the input circuit to said accumulator with respect to pulses representing integral digit periods.

3. A time interval encoder comprising a standard frequency pulse source having a given period, means for dividing said period into subdivisions, an accumulator having a pair of input terminals, means for indicating the beginning and end of a time interval to be measured, means for gating pulses from said standard source to said accumulator input terminals indicating the number of integral periods included in said time interval, circuit means for electrically indicating the particular subdivision in which said time interval begins, means for transforming said electrical indication into a multidigit representation of the time between the beginning of said time interval and the start of the next subsequent integral period, means for applying said multidigit representation to said accumulator input terminals, and means for reducing the numerical weighting at said accumulator input terminals of the multidigit representation of said subdivisions as compared with the pulses indicating integral periods.

4. In a serial binary computing circuit in which successive multidigit binary numbers are spaced in time by a predetermined word period time interval and successive pulses representing digits of said numbers are spaced by a time interval termed a digit period, a serial binary accumulator which receives numbers at word period rate, said accumulator having a pair of input terminals, a standard pulse source having a pulse repetition rate of one pulse per word period, means for electrically indicating the beginning and the end of a time interval to be measured, a gating circuit means responsive to said electrical indications for interconnecting said word period pulse source and said accumulator input terminals during said interval, an extra digit period logic circuit means for gating pulses through to said accumulator input terminals corresponding to the number of extra digit periods present at the beginning and end of said time interval, means for reducing the weight of said pulses representing extra digit periods with respect to pulses representing word periods at the input terminals to said accumulator, a standard frequency source having a period equal to one digit period synchronized with said standard word pulse source, phase shifting means coupled to said standard frequency source, logic circuit means connected to said frequency source, said phase shifting means, and to said electrical indications of the beginning and end of said time interval for indicating the fractional part of a digit period in which said start and stop pulses occur, means for translating said last-mentioned indications into binary signals corresponding to the time interval represented by said indications, means for applying said binary signals to said accumulator input terminals, and means for reducing the weighting of said binary signals representing fractional digit periods at said accumulator input terminals as compared with said pulses representing digit periods.

5. In a computer circuit for encoding time intervals, a single serial binary accumulator for storing binary information in a specified number of time slots of different significance, a standard frequency source for synchronizing operations in the computer circuit, the period of said source being equal to one digit period of the computer circuit, means for electrically indicating the beginning and end of a time interval to be measured, means for applying pulses to said accumulator in preassigned time slots to indicate the number of integral digit periods included in said interval, means for determining the additional fractional digit periods included in said time interval, means for designating the length of time represented by said fractional digit periods in parallel binary form, and means for converting the parallel binary information into serial binary pulse form and for applying the pulses to said single accumulator in time slots of lesser significance than said preassigned time slots.

6. In a computer circuit for encoding time intervals, a single serial binary accumulator for storing binary information in a specified number of time slots of different significance, a standard frequency source for synchronizing operations in the computer circuit, the period of said source being equal to one digit period of the computer circuit, means for electrically indicating the beginning and end of a time interval to be measured, means for deriving a pulse indication of the number of integral digit periods included in said time interval, means for determining the additional fractional digit periods included in said time interval, means for designating the length of time represented by said fractional digit periods in parallel binary form, means for converting the parallel binary information into serial binary pulse form, and means for applying said integral digit period pulses and said fractional digit period pulses to said single accumulator at specified distinct time slots of said accumulator, said fractional digit period pulses being applied to time slots of lesser significance.

7. In a computer circuit for encoding time intervals, a single serial binary accumulator capable of storing binary information in a specified number of time slots of different numerical significance, a standard frequency source for synchronizing the computer circuit, the period of said source being equal to one digit period of the computer circuit and a predetermined number of said periods being equal to a word length in the computer circuit, means for electrically indicating the beginning and end of a time interval to be measured, means for deriving a train of pulses indicating the number of word lengths included in said time interval, means for deriving a train of pulses indicating the number of integral digit periods in partial word lengths included in said time interval, means for determining the additional fractional digit periods included in said time interval, means for designating the length of time represented by said fractional digit periods in parallel binary form, means for converting the parallel binary information into serial binary pulse form, and means for applying said word length pulses, said integral digit period pulses, and said fractional digit period pulses to said single accumulator at specified distinct time slots of said accumulator having progressively decreasing significance.

8. In a computer circuit for encoding time intervals, a single serial binary accumulator capable of storing binary information in a specified number of time slots of different numerical significance, a standard frequency source for synchronizing the computer circuit, the period of said source being equal to one digit period of the computer circuit and a predetermined number of said periods being equal to a word length in the computer circuit, means for electrically indicating the beginning and end of a time interval to be measured, means for deriving a train of pulses indicating the number of word lengths included in said time interval, means for deriving a train of pulses indicating the number of integral digit periods in partial word lengths included in said time interval, means for deriving pulses representing the additional fractional digit periods included in said time interval, and means for applying said word length pulses, said integral digit period pulses, and said fractional digit period pulses to said single accumulator at specified distinct time slots of said accumulator having progressively decreasing significance.

References Cited in the file of this patent

UNITED STATES PATENTS

| | | |
|---|---|---|
| 2,442,403 | Flory | June 1, 1948 |
| 2,607,006 | Hoeppner | Aug. 12, 1952 |
| 2,665,410 | Burbeck | Jan. 5, 1954 |
| 2,665,411 | Frady | Jan. 5, 1954 |
| 2,738,461 | Burbeck | Mar. 13, 1956 |